Patented Feb. 20, 1934

1,947,635

UNITED STATES PATENT OFFICE 1,947,635

PROCESS OF MANUFACTURING AN ACID TOOTHPASTE

Einar Bergve, Oslo, Norway

No Drawing. Application February 25, 1930, Serial No. 431,347, and in Austria February 27, 1929

10 Claims. (Cl. 167—93)

The present invention relates to a process of manufacturing an acid tooth paste.

Acid tooth pastes have been manufactured hitherto by a colloid-grinding of the different constituents, particularly of aqueous or alcohol-bearing silica with different additions such as acids or salts, either organic or inorganic ones. It has now been found that the pastes manufactured hitherto, were in part liable to attain irregular properties, as regards the durability as well as uniformity of the mass.

These inconveniences have been observed particularly in connection with a paste mass containing silica-water-glycerin-gel, that is, a mixture having special advantages as to the absorption power of the mass and which is subjected to a colloid-grinding in order to bring about a high uniformity of the mixture and make the same well suited for use as a primary mass for the manufacture of the acid tooth paste.

I have discovered that a peptizating of such a mass can be effected by subjecting it to the colloid-grinding at an increased temperature not higher than 70° C., preferably at 60° C., because in such case the gel is transformed into a sol.

Any expert knows that an increase in temperature results generally in facilitating chemical reaction and treatments and also in causing many substances to become softer or liquid. But it is not a general fact that gels when heated are altered in their structural character. Most gels remain gels even if heated to high temperatures.

Especially if a tooth paste containing silica-water-glycerine-gel is simply heated, it will not at all alter its gel-character. Further, if this gel is subjected to a colloid-grinding at ordinary temperature, it does not alter its gel-character, even if the grinding be continued indefinitely.

But the combination of the two features (a) colloid-grinding and (b) increasing the temperature to about from 40° C. to 70° C. results in the surprising fact that the gel is easily transformed more or less into sol, the resulting product being then for the most part a silica-sol. There is a question of a peptization process and not of any ordinary mere chemical treatment. This peptization, when it has taken place, facilitates highly the continued colloid-grinding and yields a much more perfect product than in any way possible by a grinding at ordinary temperature. I have also discovered that the paste was converted more or less into a sol by such peptization and thus had taken fully the character of a liquid which is of course not suitable for use as a tooth paste. But if it is cooled during a slow stirring it again coagulates, and hence takes a form suitable to a tooth paste. The mass has again taken the state of a gel. If now this gel is subjected to a mere heating, it does not again take the sol-state. This is a sure proof of the fact that there is an essential difference between an ordinary mechanical treatment, for instance an ordinary grinding, and the present peptization-process. It is quite necessary to combine (a) and (b) in order to obtain the said result.

The effect is most favorable if the mass is completely liquid during the treatment. The mass may therefore be admixed, before the colloid-grinding at an increased temperature, with substances rendering the colloids liquid at such an increased grinding temperature without preventing the mass from coagulating again upon cooling.

The said substances must be soluble in water as well as glycerine.

Furthermore it should of course have an acid reaction. Particularly free tartaric acid, boric acid, benzoic acid or the like will be suitable to the purpose. Of course, the substances must be so chosen that the mass, upon cooling, will again coagulate and take a suitable consistency. It should be noted that the coagulation process takes place preferably during a slow stirring, because this renders a better result than in case the mass is left to itself.

In treating the paste, as hitherto used, in the cold, it cannot be prevented that air is received in the mass in the form of small air bubbles. These bubbles are inclined to collect, during storing, into larger air bubbles which cause an uneven pressing-out of the mass through the tube. This of course is rather inconvenient to the public. However, if according to present invention the mass is subjected to a colloid-grinding at an increased temperature not higher than 70° C., the said inconveniences are avoided. Also the etheric oils which are added are thereby easier incorporated in the mass, and at the increased temperature they obtain an increased vapor tension which prevents the intrusion of air into the mass. The latter may also be obtained by the treatment being performed in a special atmosphere, for instance in a carbon dioxide atmosphere, more generally in an atmosphere soluble in the mass.

I claim:

1. Process of manufacturing an acid tooth paste, consisting in preparing a paste mass containing silica-water-glycerine-gel and an acid constituent, adding thereto substances rendering the colloids liquid at an increased grinding temperature without preventing the mass from coagulating again upon cooling, the mixture so prepared being peptizated by subjecting it to a colloid-grinding at an increased temperature not higher than 70° C.

2. Process of manufacturing an acid tooth paste, consisting in peptizating a paste mass containing silica-water-glycerine-gel and an acid constituent by subjecting it to a colloid-grinding at an increased temperature not higher than 70° C.

3. Process of manufacturing an acid tooth paste, consisting in peptizating a paste mass containing silica-water-glycerine-gel and an acid constituent by subjecting it to a colloid-grinding at an increased temperature not higher than 70° C. whereupon the paste is caused to coagulate when cooling during a slow stirring.

4. Process of manufacturing an acid tooth paste, consisting in preparing a paste mass containing silica-water-glycerine-gel, adding thereto boric acid, and peptizating the mixture by subjecting it to a colloid-grinding at an increased temperature not higher than 70° C.

5. Process of manufacturing an acid tooth paste, consisting in preparing a paste mass containing silica-water-glycerine-gel, adding thereto boric acid, and peptizating the mixture by subjecting it to a colloid-grinding at an increased temperature not higher than 70° C. whereupon the paste is caused to coagulate when cooling during a slow stirring.

6. Process of manufacturing an acid tooth paste, consisting in preparing a paste mass containing silica-water-glycerine-gel, adding thereto benzoic acid, and peptizating the mixture by subjecting it to a colloid-grinding at an increased temperature not higher than 70° C.

7. Process of manufacturing an acid tooth paste, consisting in preparing a paste mass containing silica-water-glycerine-gel, adding thereto benzoic acid, and peptizating the mixture by subjecting it to a colloid-grinding at an increased temperature not higher than 70° C. whereupon the paste is caused to coagulate when cooling during a slow stirring.

8. Process of manufacturing an acid tooth paste, consisting in preparing a paste mass containing silica-water-glycerine-gel, adding thereto tartaric acid, and peptizating the mixture by subjecting it to a colloid-grinding at an increased temperature not higher than 70° C.

9. Process of manufacturing an acid tooth paste, consisting in preparing a paste mass containing silica-water-glycerine-gel, adding thereto tartaric acid, and peptizating the mixture by subjecting it to a colloid-grinding at an increased temperature not higher than 70° C. whereupon the paste is caused to coagulate when cooling during a slow stirring.

10. The method of making an acid tooth paste, consisting in subjecting a paste mass containing silica-water-glycerine-gel and an acid constituent to a colloid-grinding at a temperature of about 60° C., to peptizate the same, convert the same into a sol, and expel air therefrom, cooling the same to reconvert the mass into a gel and slowly stirring, while cooling the same.

EINAR BERGVE.